United States Patent
Sasaki et al.

(10) Patent No.: US 10,809,439 B2
(45) Date of Patent: Oct. 20, 2020

(54) IMAGE DISPLAY DEVICE

(71) Applicant: PANASONIC INTELLECTUAL PROPERTY MANAGEMENT CO., LTD., Osaka (JP)

(72) Inventors: Akihiko Sasaki, Osaka (JP); Mitsuhiro Namikoshi, Osaka (JP); Kouji Terawaki, Osaka (JP); Aime Watanuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/648,174

(22) PCT Filed: Jul. 20, 2018

(86) PCT No.: PCT/JP2018/027232
§ 371 (c)(1),
(2) Date: Mar. 17, 2020

(87) PCT Pub. No.: WO2019/058736
PCT Pub. Date: Mar. 28, 2019

(65) Prior Publication Data
US 2020/0257032 A1    Aug. 13, 2020

(30) Foreign Application Priority Data
Sep. 21, 2017 (JP) .................. 2017-181759

(51) Int. Cl.
*F21V 8/00* (2006.01)
*G02F 1/1333* (2006.01)
(Continued)

(52) U.S. Cl.
CPC ......... *G02B 6/0031* (2013.01); *G02B 6/0016* (2013.01); *G02F 1/1333* (2013.01); *G02F 1/133308* (2013.01); *G09F 9/00* (2013.01)

(58) Field of Classification Search
None
See application file for complete search history.

(56) References Cited

U.S. PATENT DOCUMENTS

2005/0099555 A1* 5/2005 Kim .................. G02B 6/009
349/58
2007/0153154 A1* 7/2007 Lee .................. G02F 1/133608
349/58

(Continued)

FOREIGN PATENT DOCUMENTS

JP    H07-333609 A    12/1995
JP    2009-283384 A    12/2009

(Continued)

OTHER PUBLICATIONS

International Search Report and Written Opinion dated Oct. 9, 2018 in International Patent Application No. PCT/JP2018/027232; with partial English translation.

*Primary Examiner* — Ashok Patel
(74) *Attorney, Agent, or Firm* — McDermott Will & Emery LLP

(57) ABSTRACT

Provided is an image display device including: liquid crystal cell; light guide plate that is disposed behind liquid crystal cell and is quadrilateral-shaped; light source that extends along at least one end face of light guide plate and emits light toward the at least one end face; reflective sheet that is disposed on a rear face of light guide plate and reflects, toward liquid crystal cell, the light emitted by light source; and a base plate that is disposed on a rear face of reflective sheet and supports reflective sheet, in which reflective sheet includes, at each of positions corresponding to both end (Continued)

portions of light source, protrusion that protrudes toward light source.

2 Claims, 7 Drawing Sheets

(51) Int. Cl.
*F21S 2/00* (2016.01)
*G09F 9/00* (2006.01)

(56) References Cited

U.S. PATENT DOCUMENTS

2009/0091688 A1* 4/2009 Tanaka .............. G02F 1/133605
349/65
2016/0231490 A1 8/2016 Yamakawa

FOREIGN PATENT DOCUMENTS

| | | |
|---|---|---|
| JP | 2012-008275 A | 1/2012 |
| WO | 2015/041045 | 3/2015 |

* cited by examiner

IMAGE DISPLAY DEVICE

CROSS-REFERENCE OF RELATED APPLICATIONS

This application is the U.S. National Phase under 35 U.S.C. § 371 of International Patent Application No. PCT/JP2018/027232, filed on Jul. 20, 2018, which in turn claims the benefit of Japanese Application No. 2017-181759, filed on Sep. 21, 2017, the entire disclosures of which Applications are incorporated by reference herein.

TECHNICAL FIELD

The present disclosure relates to an image display device for displaying an image.

BACKGROUND ART

Liquid crystal displays are known as one of image display devices for displaying an image (for example, see Patent Literature (PTL) 1). These liquid crystal displays each include a back light unit behind a liquid crystal cell. The back light unit includes, for example, a light guide plate, and a light source from which light is emitted to enter the light guide plate from an end face of the light guide plate. For example, PTL 1 discloses a technique relating to a light guide plate that is large and excellent in terms of productivity.

CITATION LIST

Patent Literature

PTL 1: Japanese Unexamined Patent Application Publication No. 2009-283384

SUMMARY OF THE INVENTION

Technical Problem

The present disclosure provides an image display device that can overcome insufficient corner intensity of light transmitted through a liquid crystal cell.

Solution to Problem

An image display device according to the present disclosure includes: a liquid crystal cell; a light guide plate that is disposed behind the liquid crystal cell and is quadrilateral-shaped; a light source that extends along at least one end face of the light guide plate and emits light toward the at least one end face; a reflective sheet that is disposed on a rear face of the light guide plate and reflects, toward the liquid crystal cell, the light emitted by the light source; and a base plate that is disposed on a rear face of the reflective sheet and supports the reflective sheet, in which the reflective sheet includes, at each of positions corresponding to both end portions of the light source, a protrusion that protrudes toward the light source.

Advantageous Effect of Invention

An image display device according to the present disclosure can overcome insufficient corner intensity of light transmitted through a liquid crystal cell.

Figure 1:
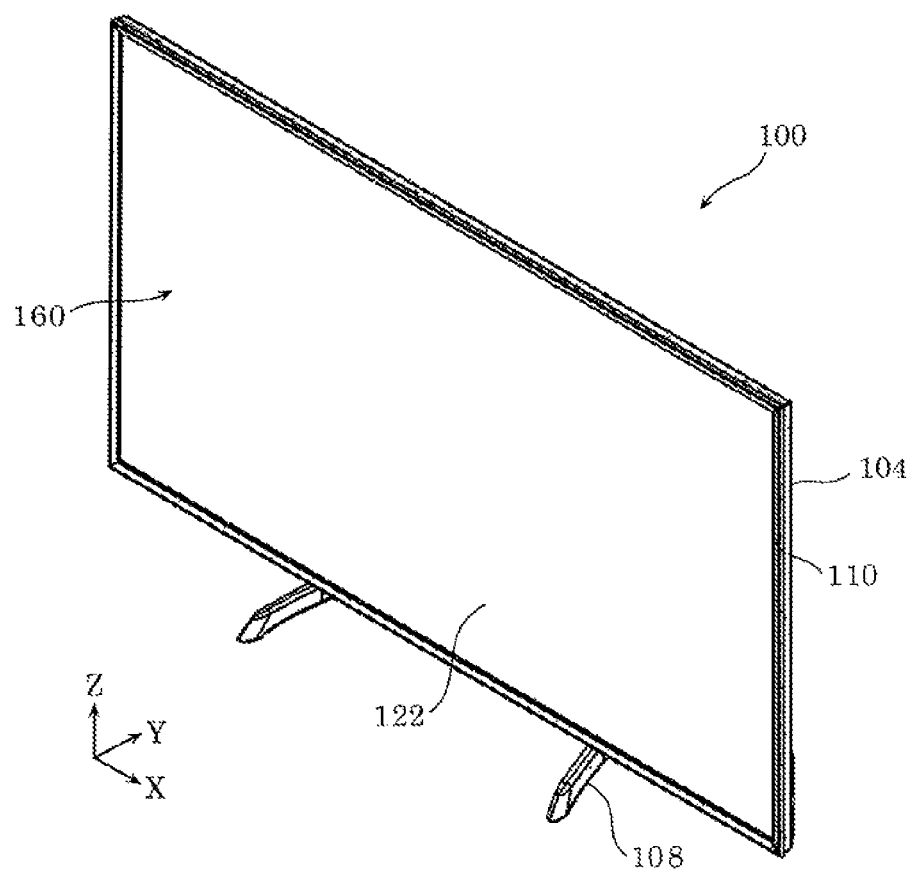
FIG. 1 is a perspective view illustrating a front face side of an image display device according to an embodiment.

DESCRIPTION OF EXEMPLARY EMBODIMENTS (Underlying Knowledge Forming Basis of Present Disclosure)

The inventors of the present application have found that conventional image display devices pose a problem as follows. Conventionally, an edge-light type back light unit in which a light source is disposed along at least one side of a light guide plate has been employed as a back light unit for an image display device with a liquid crystal cell. The light source includes, for example, multiple light emitting diodes (LEDs) as light emitting elements, and the LEDs are arranged along one side of the light guide plate. The LEDs are disposed at substantially regular intervals in a length corresponding to one side of the light guide plate. Thus, light intensity at both end portions of the light source is insufficient relative to light intensity in the center portion of the light source, and the problem of insufficient intensity of light transmitted through the liquid crystal cell occurs at the corners of the liquid crystal cell.

The present disclosure is to address the foregoing problem, and as a result of conducting in-depth study, the inventors of the present application have found that the shape of the reflective sheet disposed behind the light guide plate can compensate for the insufficient light intensity at the both end portions of the light source.

Hereinafter, embodiments will be described with reference to the drawings as appropriate. However, detailed descriptions on items already widely known and redundant descriptions regarding substantially the same configurations may be omitted. The purpose of the omission is to avoid unnecessary redundancy in the following descriptions, and to make the following descriptions readily understood by a person skilled in the art.

Moreover, the embodiments and the claims use expressions which indicate an orientation or a position of one or more objects, such as parallel, orthogonal, and uniformly spaced; however, these expressions also include the case in which the one or more objects are not strictly in the orientation or the position. For example, the expression, parallel, not only indicates that things are perfectly in parallel with each other, but also indicates that the things are substantially parallel with each other. That is to say, the expression includes a difference of about several percent. The same is true of expressions, such as the same or uniform, which indicate the relationship between two or more items of information or the relationship between two or more objects.

Note that the inventors of the present application provide the drawings and the following description in order that a person skilled in the art sufficiently understands the present disclosure, and thus they are not intended to limit the subject matter of the claims.

In addition, for the convenience of describing the following embodiments, the Z-axis direction coincides with the up-down direction, the Y-axis direction coincides with the front-rear direction, and the X-axis direction coincides with the left-right direction (lateral direction) in the following embodiments. These associations of directions are not intended to limit the orientation of an image display device according to the present disclosure during the manufacturing processes or at the time of usage. Moreover, in the following description, for example, the positive side of the X-axis indicates the arrow side of the X-axis, and the negative side of the X-axis indicates the other side of the X-axis. The same is true of the Y-axis direction and the Z-axis direction.

1-1. Overall Configuration of Image Display Device

First, the overall configuration of image display device 100 according to an embodiment will be described with reference to FIG. 1 and FIG. 2.

FIG. 1 is a perspective view illustrating a front face side of the image display device according to the embodiment. FIG. 2 is an exploded perspective view illustrating a display unit of the image display device according to the embodiment.

As illustrated in FIG. 1, image display device 100 is, for example, a flat-panel display type liquid crystal television receiver. Image display device 100 includes case 104, display unit 106 disposed inside of case 104, and stand 108 for supporting case 104.

As illustrated in FIG. 1, case 104 includes bezel 110 as a front cabinet, and a rear cabinet (not shown in the drawings). Bezel 110 has the shape of a quadrilateral frame, and covers the outer peripheral portion of liquid crystal cell 122 from the front of image display device 100. The rear cabinet covers base plate 112 from the back of image display device 100, and is connected with bezel 110.

Figure 2:
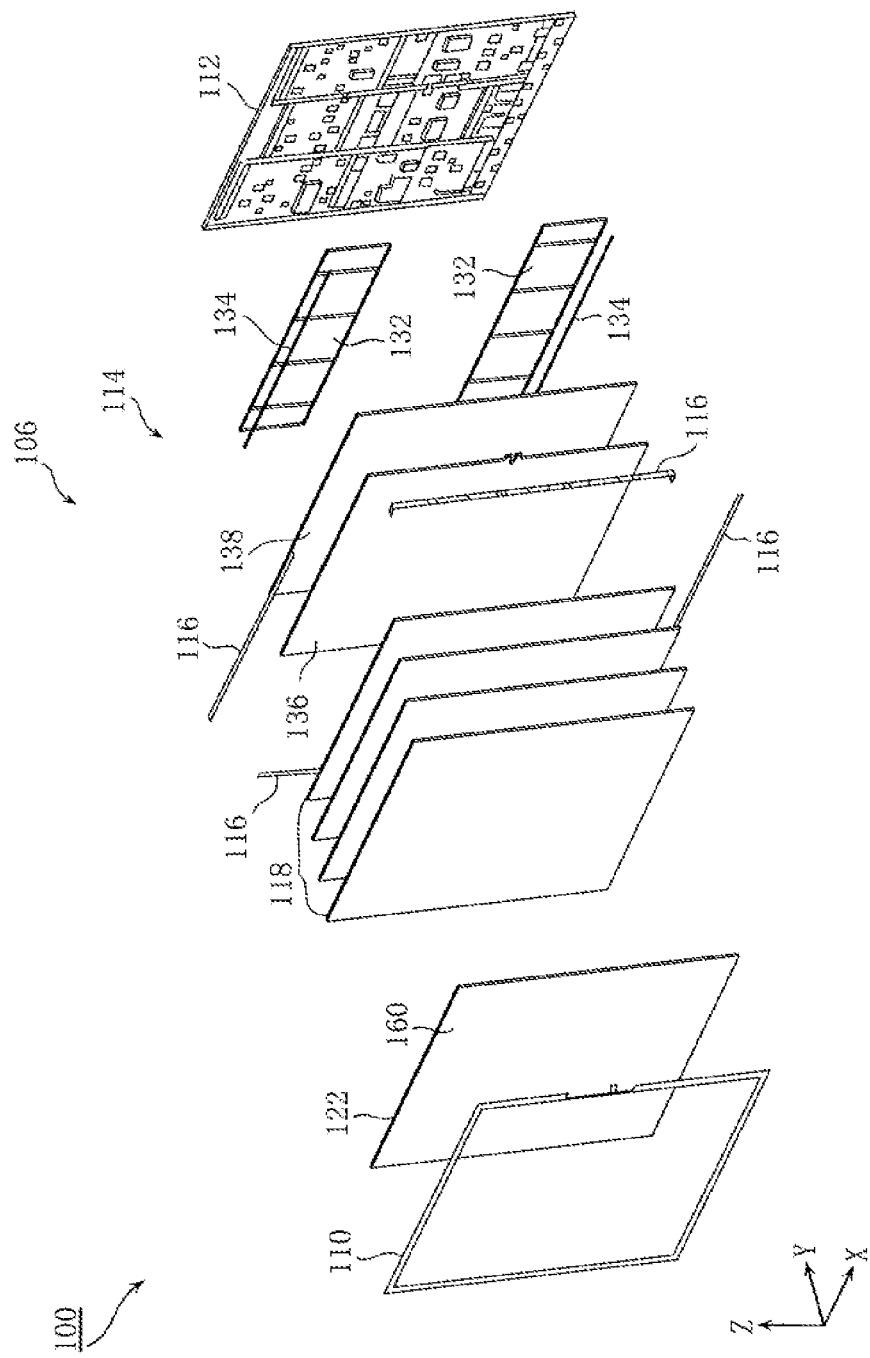
FIG. 2 is an exploded perspective view illustrating a display unit of the image display device according to the embodiment.

As illustrated in FIG. 2, display unit 106 includes base plate 112, back light unit 114, mold frame 116 formed by jointed components, optical sheet set 118 which is a combination of different types of optical sheets, and liquid crystal cell 122.

Base plate 112 is a metal planer component for supporting back light unit 114 from the back of image display device 100, and is referred to as a lower frame, etc. Base plate 112 includes, for example, a protrusion and/or a recess for improving the rigidity of base plate 112, and multiple screw holes and/or cut-and-bent portions for fixing various kinds of components to base plate 112. Moreover, wall portion 113 extending forward is provided along the periphery of base plate 112.

Back light unit 114 includes heat dissipation plate 132, light source 134, light guide plate 136, and reflective sheet 138. Back light unit 114 is an edge-light type device which guides white light, which is emitted from light source 134 and enters light guide plate 136 from an end face of light guide plate 136, to illuminate the entire rear face of liquid crystal cell 122. In this embodiment, light source 134 is disposed at the opposite end faces of light guide plate 136. Note that in association with light source 134, heat dissipation plate 132 is also disposed in two positions.

Each heat dissipation plate 132 is a component for dissipating heat generated from light source 134, and is made of highly heat-conductive metal such as aluminum. Heat dissipation plate 132 is a strip-shaped component disposed along light source 134 behind reflective sheet 138, and is hold by base plate 112.

Light source 134 includes light emitting elements 341 arranged in a line at predetermined intervals. In this embodiment, each light emitting element 341 is a LED element into which a LED chip is packaged. Moreover, light source 134 is separately disposed above light guide plate 136 (the positive side of the Z-axis) and below light guide plate 136 (the negative side of the Z-axis).

Light source 134 is attached to heat dissipation plate 132 with, for example, a heat conductive and double-face adhesive tape. Heat dissipation plate 132 is fixed to base plate 112 with screws, and thereby light source 134 is also fixed to base plate 112. Note that base plate 112 has a face flush with the front face of heat dissipation plate 132, and this face supports reflective sheet 138 together with the front face of heat dissipation plate 132.

Moreover, light source 134 includes transparent stopper 342 that protrudes toward light guide plate 136 more than light emitting elements 341 and defines the position of light guide plate 136. Stopper 342 is disposed between adjacent light emitting elements 341. Stopper 342 is disposed not between all light emitting elements 341 but at predetermined intervals.

Light guide plate 136 is formed in the shape of a quadrilateral plate in a planar view. Light guide plate 136 is supported by base plate 112. Light guide plate 136 is an injection molded acrylic resin, for example. The positions of the upper end face and the lower end face of light guide plate 136 are defined by stoppers 342, and the upper end face and the lower end face are each disposed facing light source 134 at a predetermined distance. Light from light emitting elements 341 in light source 134 enters light guide plate 136 from the upper end face and the lower end face of light guide plate 136.

Reflective sheet 138 covers the entire rear face of light guide plate 136. Reflective sheet 138 reflects light entering from both the upper and lower end faces of light guide plate 136 toward the front. Light reflected by reflective sheet 138 exits light guide plate 136 from the front face of light guide plate 136, and enters liquid crystal cell 122 from the rear face of liquid crystal cell 122. Note that the specific shape, etc. of reflective sheet 138 will be described later.

As illustrated in FIG. 2, mold frame 116 is formed, for example, by assembling elongated resin components into a frame shape. Mold frame 116 is a component for protecting the periphery of display unit 106. Note that resin mold frame 116 is taken here as an example of a frame, but a metal frame is possible. The components of mold frame 116 are individually attached to the upper end portion, the lower end portion, the right end portion (the end portion on the positive side of the X-axis), and the left end portion (the end portion on the negative side of the X-axis) of base plate 112. Each component of mold frame 116 is disposed so as to press against the outer peripheral portion of the front face of light guide plate 136 through cushion component 117 (see FIG. 5).

Optical sheet set 118 is disposed between liquid crystal cell 122 and light guide plate 136. Optical sheet set 118 is a sheet for diffusing light such that light from the front face of light guide plate 136 uniformly enters the entire rear face of liquid crystal cell 122. Optical sheet set 118 includes a prism sheet for condensing, on the rear face of liquid crystal cell 122, the light from the front face of light guide plate 136, a reflective polarization sheet (the so-called dual brightness enhancement film (DBEF) sheet) for polarizing the light from the front face of light guide plate 136, and the like. The outer peripheral portion of optical sheet set 118 is supported by mold frame 116.

Liquid crystal cell 122 is formed in the shape of a quadrilateral plate in a planar view. The front face of liquid crystal cell 122 is display surface 160 for displaying an image. The outer peripheral portion of liquid crystal cell 122 is supported by the components of mold frame 116 through cushion component 177.

Bezel 110 is formed in the shape of a quadrilateral frame, and is disposed so as to cover the outer peripheral portion of display surface 160 of liquid crystal cell 122. Bezel 110 is attached to base plate 112 with screws, for example.

1-2. Details of Reflective Sheet

Figure 3:
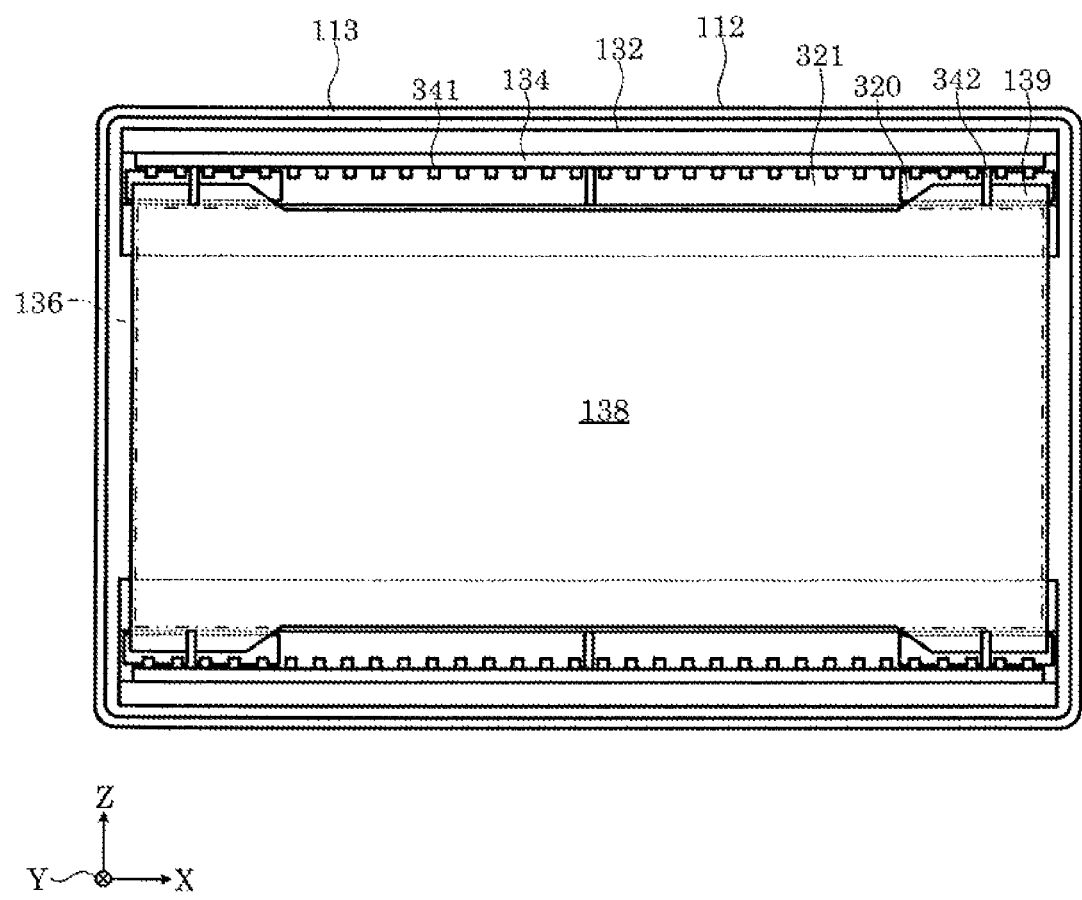
FIG. 3 is a plan view illustrating a state in which a reflective sheet is attached to a base plate according to the embodiment.
Figure 4:
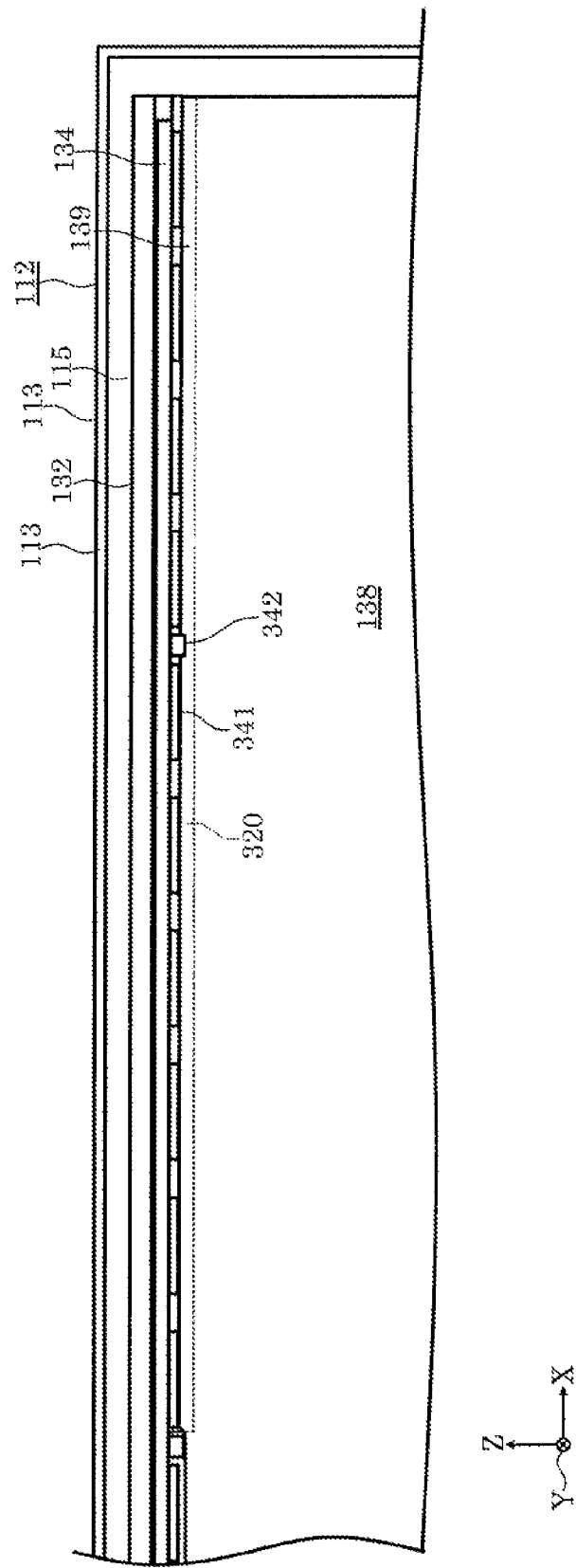
FIG. 4 is a plan view illustrating one corner of the reflective sheet according to the embodiment.
Figure 5:
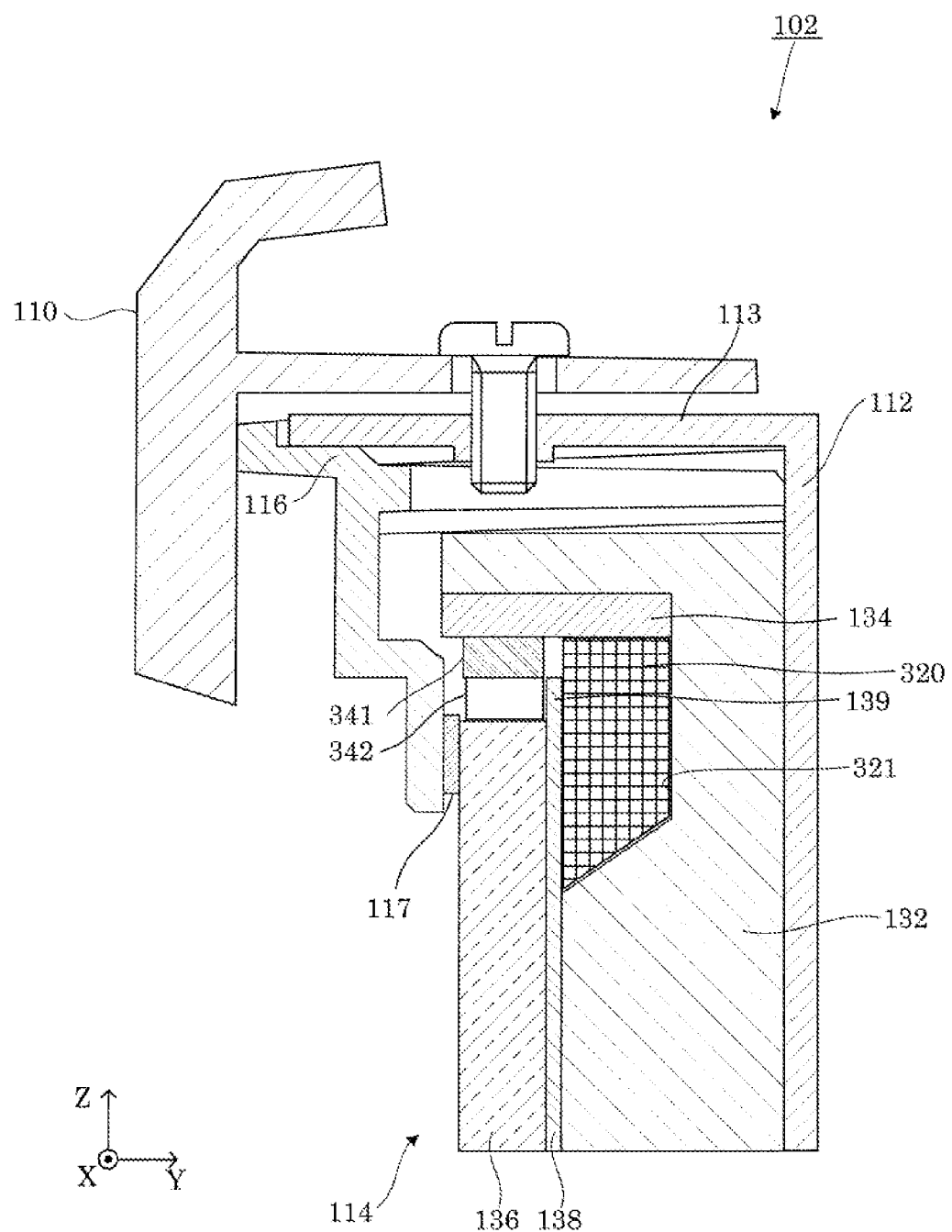
FIG. 5 is a cross sectional view illustrating an end portion of a light source of the image display device according to the embodiment.

Next, reflective sheet 138 will be described in detail. FIG. 3 is a plan view illustrating a state in which a reflective sheet is attached to a base plate according to the embodiment. FIG. 4 is a plan view illustrating one corner of the reflective sheet according to the embodiment. FIG. 5 is a cross sectional view illustrating an end portion of a light source of the image display device according to the embodiment.

As illustrated in FIG. 3, reflective sheet 138 is a quadrilateral sheet that covers the entire light guide plate 136 (denoted by the dash-dot-dot-dash line) which is quadrilateral in a planar view. Reflective sheet 138 includes, at each of positions corresponding to the both end portions of light source 134, protrusion 139 that protrudes from the edge portion of reflective sheet 138, is flush with the main body portion of reflective sheet 138, and extends toward light source 134. In this embodiment, protrusion 139 of reflective sheet 138 is disposed behind stopper 342 that protrudes more than light emitting elements 341 between adjacent light emitting elements 341 in light source 134. Light source 134 is disposed at the upper and lower end faces of light guide plate 136, and thus for each of the four corners, reflective sheet 138 includes protrusion 139.

Protrusion 139 has a size capable of compensating for the insufficient light intensity at the corner of light guide plate 136, and this size is determined based on the type of light source 134, the size of light guide plate 136, etc. As an example, the protrusion length of protrusions 139 is approximately the same as the protrusion length of stopper 342 from light emitting element 341, and the width of protrusions 139 is on the order of a width overlapping with at least 6% and at most 10% of aligned light emitting elements 341 in light source 134. More specifically, for example, in the case of image display device having a size of about 55 inches to 60 inches, as illustrated in FIG. 4, the width of protrusions 139 is on the order of width overlapping with ten light emitting elements 341 from the end of the aligned light emitting elements 341 (for example, about 100 mm), and the protrusion length is at most 0.5 mm and at least 0.1 mm. The inventors have found that with the size of protrusion 139 as described above allows for overcoming the insufficient light intensity at the corner of light guide plate 136 and uniformly illuminating the entire rear face of liquid crystal cell 122 even if a reflective tape is not applied to the end faces of light guide plate 136 orthogonal to light source 134. Note that in this embodiment, protrusion 139 does not reach the rear face of light emitting element 341, but may protrude up to the rear face of light emitting element 341.

When reflective sheet 138 is attached to base plate 112, reflective sheet 138 is straightly moved toward the front face of base plate 112 to which light source 134 is attached. In doing so, the quadrilateral portion of reflective sheet 138 is not obstructed by stoppers 342 except protrusions 139, and thus the quadrilateral portion is placed on base plate 112 without being obstructed by stoppers 342. On the other hand, protrusions 139 are obstructed by stoppers 342, and thus the (four) corners of reflective sheet 138 are curved. Accordingly, in order to flatten reflective sheet 138 on base plate 112 (including heat dissipation plate 132), a worker performs a task of sliding protrusions 139 under stoppers 342. Note that this task is not particularly difficult and can be easily and rapidly performed since each protrusion 139 has a short protrusion length and a width of about 10% of large reflective sheet 138.

As shown in FIG. 5, base plate 112 includes work space 321 extending from light source 134 beyond the end face of light guide plate 136. In this embodiment, light source 134 is attached to base plate 112 through heat dissipation plate 132, and work space 321 is formed by a groove extending in a longitudinal direction of heat dissipation plate 132. Work space 321 is provided to improve work efficiency when a worker attaches light source 134.

However, reflective sheet 138 protruding into work space 321, i.e., protrusion 139 of reflective sheet 138, may be curved toward work space 321 due to heat from light source 134, etc. In view of this, in this embodiment, support component 320 for supporting protrusion 139 of reflective sheet 138 from behind is disposed behind protrusion 139. The material of support component 320 is not particularly limited, but a sponge-like resin can be taken as an example.

Support component 320 particularly supports protrusion 139 of reflective sheet 138 from behind, and thus it is possible to prevent the corner of reflective sheet 138 from being curved due to heat, etc., and to prevent change in the light intensity over time at the corner of the rear face of liquid crystal cell 122.

1-3. Effect, Etc

As described above, image display device 100 according to the present embodiment includes: liquid crystal cell 122; light guide plate 136 that is disposed behind liquid crystal cell 122 and is quadrilateral-shaped; light source 134 that extends along at least one end face of light guide plate 136 and emits light toward the at least one end face; reflective sheet 138 that is disposed on a rear face of light guide plate 136 and reflects, toward liquid crystal cell 122, the light emitted by light source 134; and base plate 112 that is disposed on a rear face of reflective sheet 138 and supports reflective sheet 138, in which reflective sheet 138 includes, at each of positions corresponding to both end portions of light source 134, protrusion 139 that protrudes toward light source 134.

With this, the light intensity in the both end portions of strip-shaped light source 134 which is insufficient relative to that in the center portion of light source 134 can be compensated by light reflection at protrusions 139 of reflective sheet 138, and liquid crystal cell 122 can receive light having uniform light intensity across the entire light guide plate 136.

Moreover, light source 134 includes light emitting elements 341 aligned along the at least one end face of light guide plate 136, the image display device further includes stopper 342 that protrudes toward light guide plate 136 more than light emitting elements 341 and defines a position of light guide plate 136, and protrusion 139 of reflective sheet 138 is disposed behind stopper 342.

With this, protrusion 139 exists behind stopper 342 for defining the position of the end face of light guide plate 136, and thus it can be ensured that light emitted from light emitting element 341 is reflected toward the end face of light guide plate 136, thereby allowing effective compensation for the insufficient light intensity at the corner of light source 134.

Moreover, base plate 112 includes work space 321 that extends along light source 134 behind light source 134 and is groove-shaped, and the image display device further includes support component 320 that is disposed in work space 321 and supports protrusion 139 of reflective sheet 138 from behind.

With this, it is possible to prevent protrusion 139 and the vicinity thereof from being curved even when they are subjected to heat, etc., and to prevent a change in light intensity over time at the corner of liquid crystal cell 122.

Other Embodiments

The embodiment has been described as above to exemplify technique that is disclosed in the present application. However, the technique disclosed in the present disclosure is not limited to the above embodiment, and is applicable to embodiments to which changes, replacements, additions, omissions, etc. have been suitably made. In addition, it is also possible to combine each of the structural elements described in the above embodiment to come up with other embodiments. Thus, other embodiments will be exemplified as follows.

For example, in the above embodiment, heat dissipation plate 132 is attached to base plate 112, but base plate 112 may include no heat dissipation plate 132. When heat dissipation plate 132 is not included, work space 321 may be formed by recessing base plate 112 toward the back of the image display device.

Moreover, in the above embodiment, protrusions 139 are provided in the both end portions of the upper edge and the both end portions of the lower edge of reflective sheet 138, but it is sufficient to provide protrusions 139 in association with light source 134. When light source 134 is not separated, it is sufficient to provide two protrusions 139 in their respective positions corresponding to the both end portions of light source 134. Moreover, when light source 134 is disposed lateral to light guide plate 136, each protrusion 139 protrudes laterally.

Figure 6:
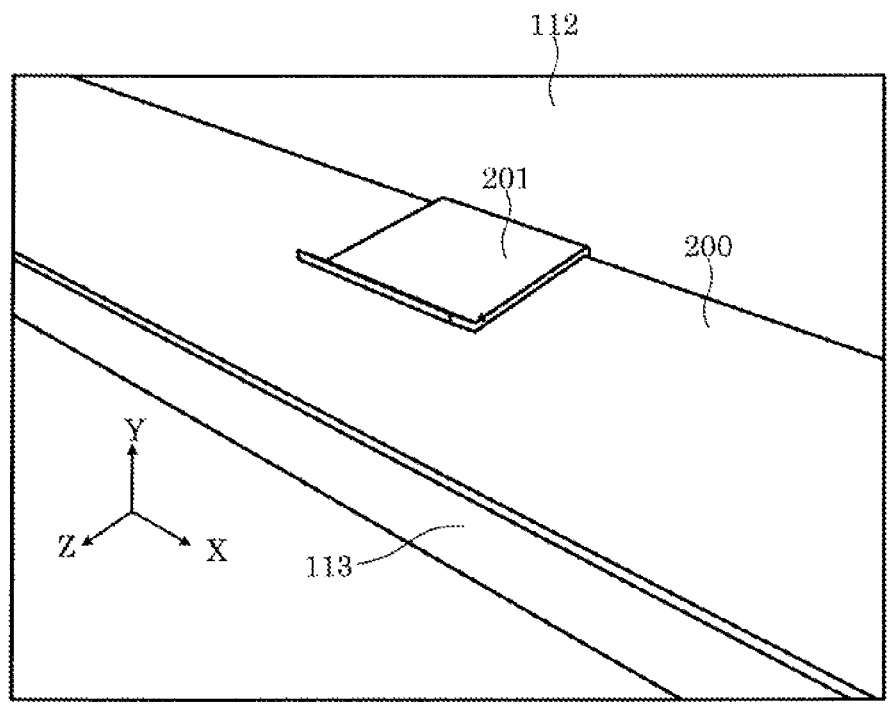
FIG. 6 is a perspective view illustrating the rear face side of the base plate to which a circuit board is attached according to the embodiment.
Figure 7:
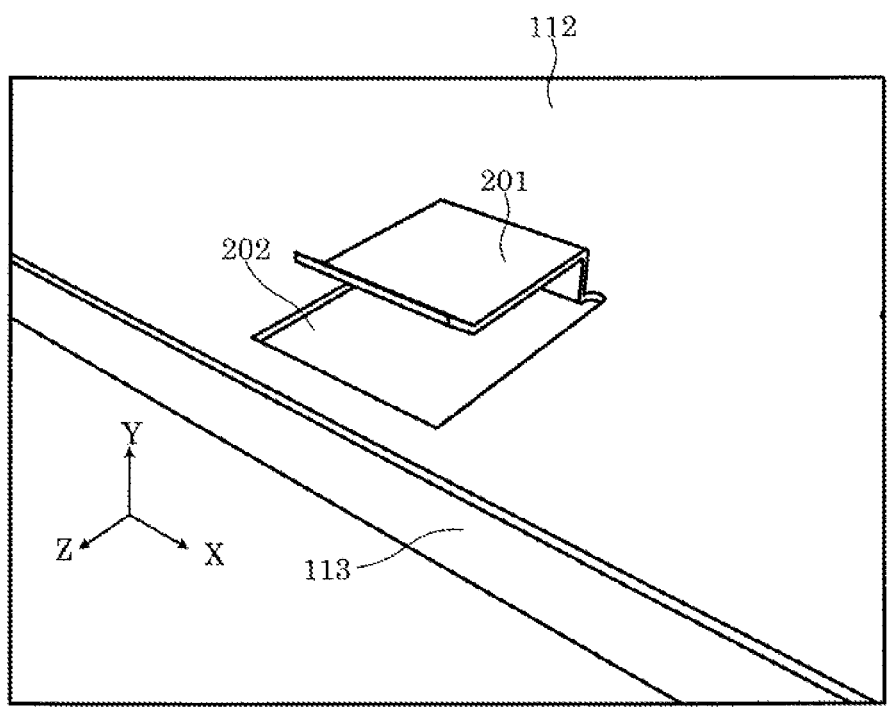
FIG. 7 is a perspective view illustrating the rear face side of the base plate from which the circuit board and an insulating sheet are detached according to the embodiment.

Moreover, through-hole 202 may be provided in base plate 112. Specifically, as shown in FIG. 6, for example, cut-and-bent portion 201 formed by cutting and bending a part of base plate 112 toward the rear face of the image display device may be provided to hold circuit board 200 for driving liquid crystal cell 122. In this case, as shown in FIG. 7, relatively large through-hole 202 exists in a position corresponding to cut-and-bent portion 201. When such a through-hole 202 exists in base plate 112, dust may come in through through-hole 202, and further light leakage may occur. Accordingly, in a conventional manner, such through-hole 202 is individually closed using a seal.

Figure 8:
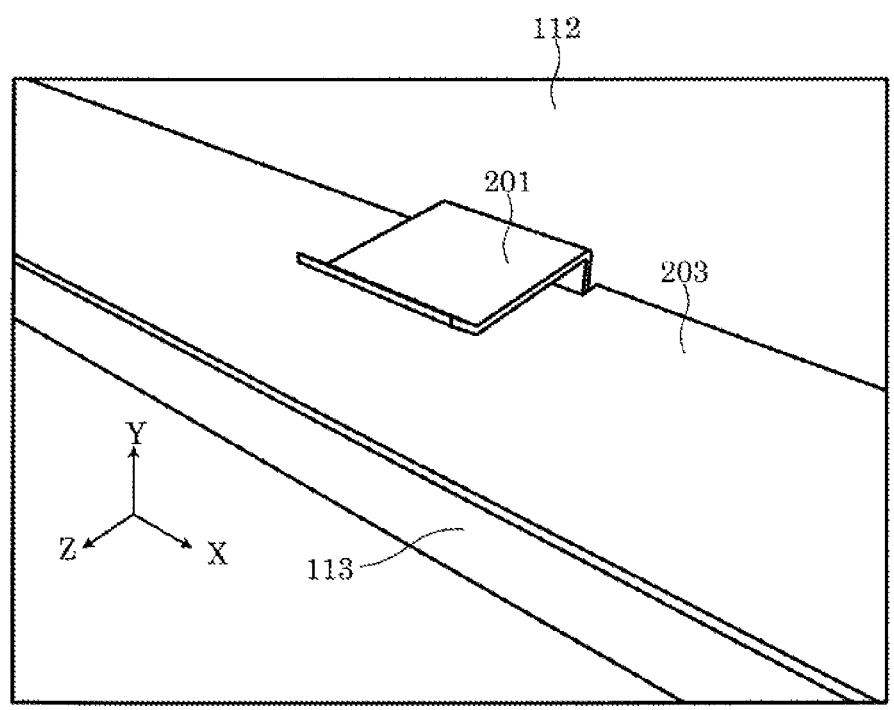
FIG. 8 is a perspective view illustrating the rear face side of the base plate from which the circuit board is detached and to which the insulating sheet is attached according to the embodiment.

However, as shown in FIG. 8, insulating sheet 203 for insulating circuit board 200 and base plate 112 may be extended to cover through-hole 202, thereby preventing the dust penetration and the light leakage.

Furthermore, image display device 100 according to the present embodiments can be realized as, for example, a liquid crystal television receiver. However, the configuration of image display device 100 may be applied to displays for personal computers and mobile terminals, such as tablet terminals, smartphones, etc., for example.

The above has described the embodiments to exemplify the technique according to the present disclosure. The drawings and detailed descriptions are provided for this purpose.

Therefore, the drawings and the detailed descriptions may include, among the structural elements essential for addressing issues, a structural element which is not essential for addressing the issues. Thus, those non-essential structural elements should not be immediately considered as necessary because they are illustrated in the drawings and described in detail.

In addition, since above embodiments are for exemplifying the technique according to the present disclosure, various changes, replacements, additions, omissions, etc. can be made in the claims and in other equivalent areas.

INDUSTRIAL APPLICABILITY

The present disclosure is applicable to an image display device for displaying an image. Specifically, the present disclosure is applicable to a television receiver, a monitor display, digital signage, a tablet terminal, a smartphone, and a table-type display device.

REFERENCE MARKS IN THE DRAWINGS 100 image display device
104 case
106 display unit
108 stand
110 bezel
112 base plate
114 back light unit
116 mold frame
118 optical sheet set
122 liquid crystal cell
132 heat dissipation plate
134 light source
136 light guide plate
138 reflective sheet
139 protrusion
160 display surface
200 circuit board
201 cut-and-bent portion
202 through-hole
203 insulating sheet
320 support component
321 work space
341 light emitting element
342 stopper

The invention claimed is:
1. An image display device, comprising:
a liquid crystal cell;
a light guide plate that is disposed behind the liquid crystal cell and is quadrilateral-shaped;

a light source that extends along at least one end face of the light guide plate and emits light toward the at least one end face;

a reflective sheet that is disposed on a rear face of the light guide plate and reflects, toward the liquid crystal cell, the light emitted by the light source; and a base plate that is disposed on a rear face of the reflective sheet and supports the reflective sheet, wherein the reflective sheet includes, at each of positions corresponding to both end portions of the light source, a protrusion that protrudes toward the light source, the base plate includes a work space that extends along the light source behind the light source and is groove-shaped, and the image display device further comprises a support component that is disposed in the work space and supports the protrusion of the reflective sheet from behind.

2. The image display device according to claim 1, wherein the light source includes a plurality of light emitting elements aligned along the at least one end face of the light guide plate, the image display device further comprises a stopper that protrudes toward the light guide plate more than the plurality of light emitting elements and defines a position of the light guide plate, and the protrusion of the reflective sheet is disposed behind the stopper.

\* \* \* \* \*